United States Patent
Fu et al.

(10) Patent No.: US 8,854,786 B2
(45) Date of Patent: Oct. 7, 2014

(54) SYSTEM AND METHOD FOR PROVIDING SURGE PROTECTION

(71) Applicants: Dengmeng Fu, Shanghai (CN); Marlon Galsim, Shanghai (CN); Qing Yun, Shanghai (CN); Jinsong Lee, Shenzhen (CN)

(72) Inventors: Dengmeng Fu, Shanghai (CN); Marlon Galsim, Shanghai (CN); Qing Yun, Shanghai (CN); Jinsong Lee, Shenzhen (CN)

(73) Assignee: Schneider Electric IT Corporation, West Kingston, RI (US)

( * ) Notice: Subject to any disclaimer, the term of this patent is extended or adjusted under 35 U.S.C. 154(b) by 0 days.

(21) Appl. No.: 13/684,876

(22) Filed: Nov. 26, 2012

(65) Prior Publication Data
US 2013/0222958 A1    Aug. 29, 2013

Related U.S. Application Data

(63) Continuation of application No. 13/500,797, filed as application No. PCT/CN2009/074372 on Oct. 9, 2009, now abandoned.

(51) Int. Cl.
- *H02H 1/00* (2006.01)
- *H02H 9/04* (2006.01)
- *H02H 9/00* (2006.01)

(52) U.S. Cl.
CPC ............. *H02H 9/04* (2013.01); *H02H 9/042* (2013.01); *H02H 9/005* (2013.01)
USPC .......................................... 361/117; 361/120

(58) Field of Classification Search
USPC ........................................ 361/117–120, 127
See application file for complete search history.

(56) References Cited

U.S. PATENT DOCUMENTS

| | | | |
|---|---|---|---|
| 4,584,622 A | 4/1986 | Crosby et al. | |
| 4,675,772 A | 6/1987 | Epstein | |
| 4,739,436 A | 4/1988 | Stefani et al. | |
| 4,760,485 A * | 7/1988 | Ari et al. | 361/54 |
| 4,860,185 A | 8/1989 | Brewer et al. | |
| 4,901,183 A | 2/1990 | Lee | |
| 4,907,118 A | 3/1990 | Hames | |

(Continued)

FOREIGN PATENT DOCUMENTS

| | | |
|---|---|---|
| CN | 200990509 Y | 12/2007 |
| EP | 0 239 863 A1 | 10/1987 |

OTHER PUBLICATIONS

International Preliminary Report on Patentability from corresponding PCT/CN2009/074372 and Written Opinion of the International Searching Authority dated Apr. 11, 2012.

(Continued)

*Primary Examiner* — Danny Nguyen
(74) *Attorney, Agent, or Firm* — Lando & Anastasi, LLP

(57) ABSTRACT

Methods and systems described herein provide protection for sensitive circuits against power surges on power lines. A surge protector for protecting a load coupled to a power source is provided. The surge protector includes an input having a first node, a second node and a third node to respectfully couple to line, neutral, and ground connections of a power source, an output having a fourth node, a fifth node, and a sixth node for respectfully coupling to line, neutral and ground connections of the load, a first voltage limiting circuit coupled between the fourth node and the fifth node, a first inductor coupled between the first node and the fourth node, and a second voltage limiting circuit coupled between the first node and the second node.

13 Claims, 2 Drawing Sheets

(56) References Cited

U.S. PATENT DOCUMENTS

| | | | |
|---|---|---|---|
| 5,136,455 A * | 8/1992 | Billingsley | 361/56 |
| 5,157,572 A | 10/1992 | Bird | |
| 5,617,284 A | 4/1997 | Paradise | |
| 5,646,810 A | 7/1997 | Funke | |
| 5,835,326 A | 11/1998 | Callaway | |
| 5,864,454 A | 1/1999 | Zaretsky | |
| 6,556,410 B1 | 4/2003 | Manning et al. | |
| 7,019,954 B2 | 3/2006 | Manning et al. | |
| 7,068,487 B2 | 6/2006 | Harford | |
| 7,184,252 B2 | 2/2007 | Harford | |
| 2009/0073618 A1 * | 3/2009 | Wang | 361/56 |

OTHER PUBLICATIONS

Littlefuse, Inc., Circuit Protection Specialists, Application Notes, Combining GDTs and MOVs for Surge Protection of AC Power Lines, Jan. 2002, 4 pages.

\* cited by examiner

US 8,854,786 B2

SYSTEM AND METHOD FOR PROVIDING SURGE PROTECTION

RELATED APPLICATIONS

This application is a continuation under 35 U.S.C. §120 of U.S. application Ser. No. 13/500,797, entitled "SYSTEM AND METHOD FOR PROVIDING SURGE PROTECTION," filed on Oct. 9, 2009, which is herein incorporated by reference in its entirety. U.S. application Ser. No. 13/500,797 is a National Stage application under 35 U.S.C. §371 of International Application PCT/CN2009/074372, filed on Oct. 9, 2009, entitled "SYSTEM AND METHOD FOR PROVIDING SURGE PROTECTION," all of which are hereby herein incorporated by reference in their entirety for all purposes.

BACKGROUND

1. Field of the Invention

At least some embodiments in accordance with the present invention relate generally to power distribution products and methods that provide protection against power surges on power lines coupled to sensitive loads.

2. Discussion of Related Art

Power surges in power lines can permanently damage computers, televisions and other sensitive equipment used in the home and in office or industrial environments. Power strips having surge protection to provide power to sensitive components are known and are effective for some but not all power surge events that may occur. While additional components may be added to existing devices to provide additional protection, the additional cost and increase in size often do not justify the additional protection that results.

SUMMARY OF THE INVENTION

A first aspect of the invention is directed to a surge protector for protecting a load coupled to a power source. The surge protector includes an input having a first node, a second node and a third node to respectfully couple to line, neutral, and ground connections of a power source, an output having a fourth node, a fifth node, and a sixth node for respectfully coupling to line, neutral and ground connections of the load, a first voltage limiting circuit coupled between the fourth node and the fifth node, a first inductor coupled between the first node and the fourth node, and a second voltage limiting circuit coupled between the first node and the second node.

The surge protector may include a third voltage limiting circuit coupled between the fifth node and the sixth node, a second inductor coupled between the second node and the fifth node, and a fourth voltage limiting circuit coupled between the second node and the third node. The surge protector may also include a fifth voltage limiting circuit coupled between the fourth node and the sixth node. The second voltage limiting circuit may include a first gas discharge tube and may include a resistive device coupled in series with the first gas discharge tube, and the resistive device may include a positive temperature coefficient resistor. Each of the first, third and fifth voltage limiting circuits may include a metal oxide varistor, and the fourth voltage limiting circuit may include a gas discharge tube. Each of the first, second, third, fourth and fifth voltage limiting circuits has a trigger voltage, and the trigger voltages of the second and fourth voltage limiting circuits may be greater than the trigger voltages of the first, third and fifth voltage limiting circuits.

A second aspect of the invention is directed to a method of protecting a load from a power surge, the load having a power input having a first node, a second node and a third node to respectively couple to line, neutral and ground connections of a power source. The method includes limiting voltage across the first node and the second node in response to a power voltage surge across the line and neutral connections using a first voltage limiting circuit coupled between the first node and the second node, limiting current from the power surge across the line and neutral connections through the first voltage limiting circuit using a series inductance coupled between the line connection and the first node, and limiting voltage across the line connection and the neutral connection in response to the power voltage surge across the line and neutral connections using a second voltage limiting circuit coupled between the line connection and the neutral connection of the power source.

The method may also include limiting voltage across the second node and the third node in response to a power voltage surge across the neutral and ground connections using a third voltage limiting circuit coupled between the second node and the third node, limiting current from the power surge across the neutral and ground connections through the third voltage limiting circuit using a series inductance coupled between the neutral connection and the second node, limiting voltage across the neutral connection and the ground connection in response to the power voltage surge across the neutral and ground connections using a fourth voltage limiting circuit coupled between the neutral connection and the ground connection of the power source. The method may still further include limiting voltage across the first node and the third node in response to a power voltage surge across the line and ground connections using a fifth voltage limiting circuit coupled between the first node and the third node. The first voltage limiting circuit may have a lower trigger voltage than the second voltage limiting circuit, and the method may further include turning the first voltage limiting circuit on prior to turning the second voltage limiting circuit on. The third voltage limiting circuit may have a lower trigger voltage than the fourth voltage limiting circuit, and the method may further include turning the third voltage limiting circuit on prior to turning the fourth voltage limiting circuit on. The method may also include using a metal oxide varistor in the first voltage limiting circuit and a gas discharge tube in the second voltage limiting circuit, using a metal oxide varistor in the third voltage limiting circuit, and using a metal oxide varistor in the fifth voltage limiting circuit.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
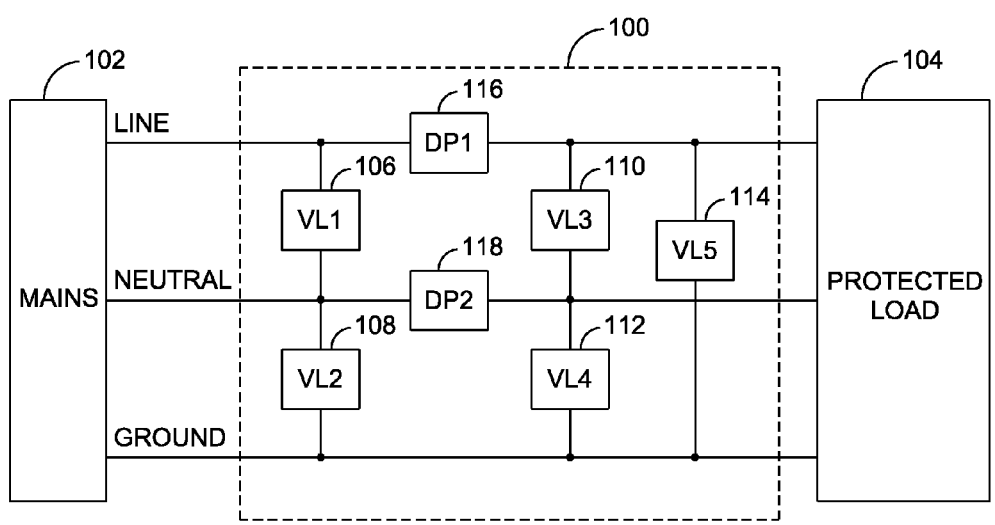
FIG. 1 is a functional block diagram of a surge protector in accordance with one embodiment.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

At least one embodiment disclosed herein is directed to a surge protection device having improved performance for protecting sensitive equipment. The surge protection device may be incorporated in power distribution strips such as those available from American Power Conversion (APC) Corporation of West Kingston, Mass., the assignee of the current application. Generally surge protection devices are designed to meet one or more industry standards, including those promulgated by Underwriters Laboratories (UL). More particularly, UL 1449, titled "Standards for Safety for Surge Protective Devices" provides standards for surge protection devices, and the recently issued third edition of UL 1449 provides an increase in the test current of a test pulse used to measure limiting voltage (VPR) of a surge protector. UL 1449, $2^{nd}$ Edition requires a test pulse of 6 kV/0.5 kA, while UL 1449, $3^{rd}$ Edition requires a test pulse of 6 kV/3 kA. At least some embodiments disclosed herein provide a VPR of less than 330 volts when tested at the UL 1449, $3^{rd}$ Edition levels.

One embodiment of a surge protector 100 will now be described with reference to FIG. 1 which shows a block diagram of the surge protector. The surge protector 100 is shown coupled to input power mains 102 to receive power and is coupled to a protected load 104. The interface between the surge protector and the mains may be implemented using a standard three wire power cord and connector and the interface provided at the output of the surge protector may be one or more standard power outlets incorporated into a power strip. As shown in FIG. 1, the input from the mains includes three conductors including a line conductor, a neutral conductor and a ground conductor, and similarly, the interface from the surge protector 100 to the load includes a line conductor, a neutral conductor and a ground conductor.

The surge protector 100 includes five voltage limiting circuits 106, 108, 110, 112 and 114, and two decoupling circuits 116 and 118. The first decoupling circuit 116 is coupled in series between the line input and the line output of the surge protector and the second decoupling circuit is coupled in series between the neutral input and neutral output of the surge protector. Each of the five voltage limiting circuits is coupled in parallel across either two of the input conductors or two of the output conductors. Voltage limiting circuit 106 is coupled across the input line and neutral conductors, voltage limiting circuit 108 is coupled across the input neutral and ground conductors, voltage limiting circuit 110 is coupled across the output line and neutral conductors, voltage limiting circuit 112 is coupled across the output neutral and ground conductors, and voltage limiting circuit 114 is coupled across the output line and ground conductors.

In one embodiment, the voltage limiting circuits are implemented using non-linear components, such as MOVs, GDTs, TVS, and similar components or combinations of components. The decoupling circuits in this embodiment include devices having a serial impedance that increases with input signal frequency and can withstand high voltages, and in one embodiment, as discussed below, the decoupling circuits are implemented using inductors. In general, the back end voltage limiting circuits 110, 112 and 114 are designed to have a lower trigger voltage than the front end voltage limiting circuits 106 and 108, while the front end voltage limiting circuits 106 and 108 are designed to have a higher current capability than the back end voltage limiting circuits 110, 112 and 114.

Further, the residual voltage characteristics of the front end voltage circuits are designed to be lower than those of the back end voltage limiting circuits.

The surge protector 100 provides protection for a load against voltages occurring between the input line and neutral, between the input line and ground, and between the input neutral and ground. Operation of the surge protector 100 for each of these three surge conditions will now be discussed.

The surge protector 100 operates in response to a surge (for example, the 6 kV/3 kA surge of UL 1449, $3^{rd}$ Edition) at the mains input between line and neutral as follows. First, once the trigger voltage of voltage limiting circuit 110 is reached, then the voltage limiting circuit 110 will turn on and the current though the circuit will increase. The current is a pulse current and the voltage across the decoupling circuits 116 and 118 will start to rise once the voltage limiting circuit 110 is triggered. The rise in voltage across the decoupling circuits causes the voltage across voltage limiting circuit 106 to increase. Once the voltage across voltage limiting circuit 106 reaches its trigger voltage, then voltage limiting circuit 106 will turn on. As discussed above, voltage limiting circuit 106 has a lower residual voltage and a higher current capacity than voltage limiting circuit 110, and once voltage limiting circuit 106 is triggered, then most of the current from the surge will pass through voltage limiting circuit 106. The design of the surge protector 100 allows the maximum current through voltage limiting circuit 110 to be controlled, and therefore, the voltage across circuit 110 to be controlled. The voltage across voltage limiting circuit 110 is the voltage VPR line to neutral that appears across the load. In one embodiment, the VPR line to neutral is designed to be less than 330 volts.

For a surge occurring at the mains input between line and ground, the surge protector 100 operates as follows. First, once the trigger voltage of voltage limiting circuit 114 is reached, then the voltage limiting circuit 114 will turn on and the current though the circuit will increase. The current is a pulse current and the voltage across decoupling circuit 116 will start to rise once the voltage limiting circuit 114 is triggered. The rise in voltage across the decoupling circuit 116 causes the voltage across voltage limiting circuits 106 and 108 to increase. Once the voltage across voltage limiting circuits 106 and 108 reaches the trigger voltage for these circuits, then voltage limiting circuits 106 and 108 will turn on. As discussed above, voltage limiting circuits 106 and 108 have a lower residual voltage and a higher current capacity than voltage limiting circuit 114, and once voltage limiting circuits 106 and 108 are triggered, then most of the current from the surge will pass through voltage limiting circuits 106 and 108. The design of the surge protector 100 allows the maximum current through voltage limiting circuit 114 to be controlled, and therefore, the voltage across circuit 114 to be controlled. The voltage across voltage limiting circuit 114 is the voltage VPR line to ground that appears across the load. In one embodiment, the VPR line to ground is designed to be less than 330 volts.

For a surge occurring at the mains input between neutral and ground, the surge protector 100 operates as follows. First, once the trigger voltage of voltage limiting circuit 112 is reached, then the voltage limiting circuit 112 will turn on and the current though the circuit will increase. The current is a pulse current and the voltage across decoupling circuit 118 will start to rise once the voltage limiting circuit 112 is triggered. The rise in voltage across the decoupling circuit 118 causes the voltage across voltage limiting circuit 108 to increase. Once the voltage across voltage limiting circuit 108 reaches the trigger voltage for voltage limiting circuit 108, then voltage limiting circuit 108 will turn on. As discussed above, voltage limiting circuit 108 has a lower residual voltage and a higher current capacity than voltage limiting circuit 112, and once voltage limiting circuit 108 is triggered, then most of the current from the surge will pass through voltage limiting circuit 108. The design of the surge protector 100 allows the maximum current through voltage limiting circuit 112 to be controlled, and therefore, the voltage across circuit 112 to be controlled. The voltage across voltage limiting circuit 112 is the voltage VPR neutral to ground that appears across the load. In one embodiment, the VPR neutral to ground is designed to be less than 330 volts.

Figure 2:
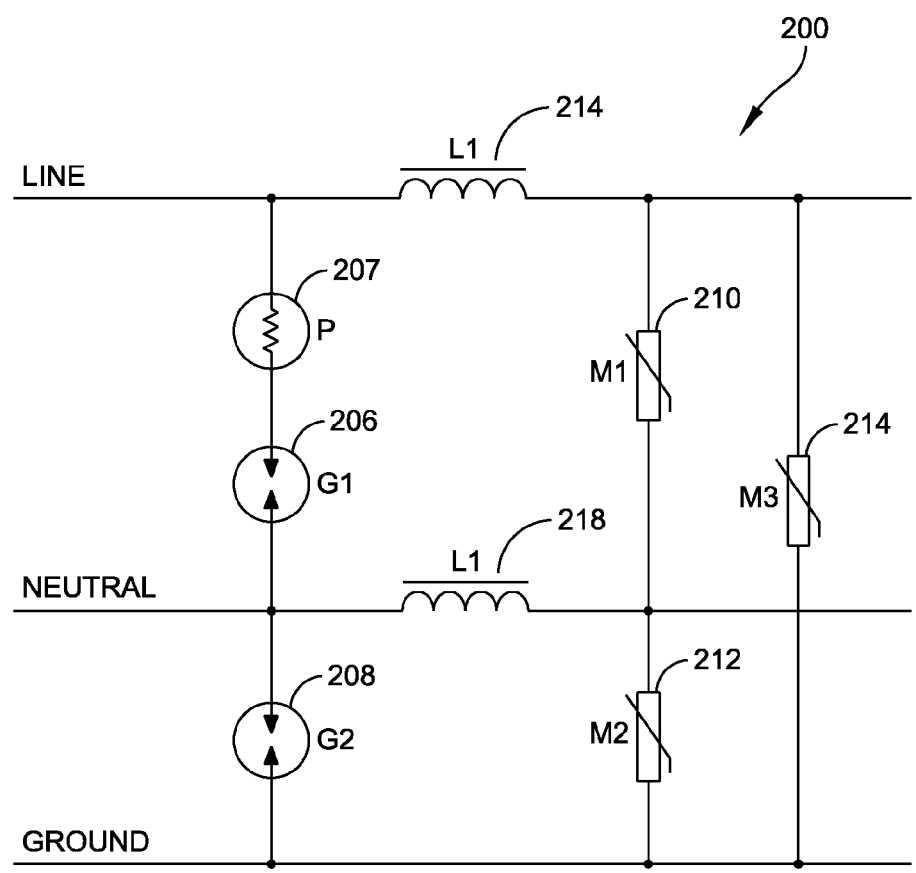
FIG. 2 is a circuit diagram of a surge protector in accordance with one embodiment.

FIG. 2 shows a schematic diagram of a surge protector 200. The surge protector 200 is one circuit implementation of the surge protector 100 shown in block diagram form in FIG. 1. The surge protector 200 includes three metal oxide varistors 210, 212 and 214, two inductors 214 and 218, two gas discharge tubes 206 and 208 and a positive temperature coefficient (PTC) resistor 207. In the surge protector 200, metal oxide varistors 210, 212 and 214 function respectively as voltage limiting circuits 110, 112 and 114. Inductors 214 and 218 function as the decoupling circuits 114 and 118. Gas discharge tube 208 functions as the voltage limiting device 108, and gas discharge tube 206 in combination with PTC resistor 207 functions as the voltage limiting device 106. In embodiments of the invention, the PTC resistor is series connected with the gas discharge tube 206, to lower the current through the gas discharge tube 206 after the surge has passed to turn off gas discharge tube 206.

In one embodiment implemented in accordance with the circuit diagram of FIG. 2, each of the gas discharge tubes 206 and 208 are implemented using a device having a DC sparkover voltage of 400V, such as devices identified as GD82R400, each of the MOVs 210, 212 and 214 are implemented using 130V MOVs, such as those identified as GNR20D201K and the PTC resistor 207 is implemented using a LVR200S PTC device. Further, the inductors 214 and 218 are implemented using 10 to 100 microhenry inductors having an iron powder core.

In other embodiments, other devices may be used to implement circuits in accordance with the present invention having the functionality described in conjunction with the functional block diagram of FIG. 1.

In the embodiment described above with reference to FIG. 1 and FIG. 2, the input voltage is single phase 120 VAC. In other embodiments, as readily understood by one of ordinary skill in the art based on this disclosure, surge protectors may be designed for use with other voltages and with multiphase inputs. In embodiments having more than one input phases, additional components would be added to the surge protector for each input phase line.

In different embodiments, surge protectors described herein may be used in a power strip having multiple receptacles for providing power or may be used in sensitive electronic devices at the power input of the devices and can also be used in uninterruptible power supplies (UPS's) to provide surge protection for the UPS and for devices coupled to the UPS.

At least one embodiment described above provides an advantage over typical surge protectors by providing protection against surges occurring between line to neutral as well as line to ground and neutral to ground.

At least one embodiment provides advantages over prior art devices that use capacitors, as the capacitors are typically relatively large in size, and can have undesirable leakage currents. Further, the inductors used in at least some embodiments of surge protectors described herein, provide additional powerline filtering for loads used with the surge protectors.

Any references above to front and back, left and right, top and bottom, or upper and lower and the like are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects and embodiments disclosed herein.

References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence have any limiting effect on the scope of any claim elements.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A surge protector for protecting a load coupled to a power source, the surge protector comprising:
   an input having a first node, a second node and a third node to respectfully couple to line, neutral, and ground connections of a power source;
   an output having a fourth node, a fifth node, and a sixth node for respectfully coupling to line, neutral and ground connections of the load;
   a first voltage limiting circuit coupled between the fourth node and the fifth node;
   a first inductor coupled between the first node and the fourth node; and
   a second voltage limiting circuit coupled between the first node and the second node, the second voltage limiting circuit including a first gas discharge tube, and a resistive device coupled in series with the first discharge tube, wherein the resistive device comprises a positive temperature coefficient resistor.

2. The surge protector of claim, 1, further comprising:
a third voltage limiting circuit coupled between the fifth node and the sixth node;
a second inductor coupled between the second node and the fifth node; and
a fourth voltage limiting circuit coupled between the second node and the third node.

3. The surge protector of claim 2, further comprising a fifth voltage limiting circuit coupled between the fourth node and the sixth node.

4. The surge protector of claim 1, wherein each of the first, third and fifth voltage limiting circuits includes a metal oxide varistor.

5. The surge protector of claim 4, wherein the fourth voltage limiting circuit includes a gas discharge tube.

6. A surge protector for protecting a load coupled to a power source, the surge protector comprising:
an input having a first node, a second node and a third node to respectfully couple to line, neutral, and ground connections of a power source;
an output having a fourth node, a fifth node, and a sixth node for respectfully coupling to line, neutral and ground connections of the load;
a first voltage limiting circuit coupled between the fourth node and the fifth node;
a first inductor coupled between the first node and the fourth node;
a second voltage limiting circuit coupled between the first node and the second node; and
a fifth voltage limiting circuit coupled between the fourth node and the sixth node;
wherein each of the first, second, third, fourth and fifth voltage limiting circuits has a trigger voltage, and wherein the trigger voltages of the second and fourth voltage limiting circuits is greater than the trigger voltages of the first, third and fifth voltage limiting circuits.

7. A method of protecting a load from a power surge, the load having a power input having a first node, a second node and a third node to respectively couple to line, neutral and ground connections of a power source, the method comprising:
limiting voltage across the first node and the second node in response to a power voltage surge across the line and neutral connections using a first voltage limiting circuit coupled between the first node and the second node;
limiting current from the power surge across the line and neutral connections through the first voltage limiting circuit using a series inductance coupled between the line connection and the first node;
limiting voltage across the line connection and the neutral connection in response to the power voltage surge across the line and neutral connections using a second voltage limiting circuit coupled between the line connection and the neutral connection of the power source;
using a metal oxide varistor in the first voltage limiting circuit and a gas discharge tube in the second voltage limiting circuit; and
using a positive thermal coefficient resistor in the second voltage limiting circuit coupled in series with the gas discharge tube.

8. The method of claim 6, further comprising:
limiting voltage across the second node and the third node in response to a power voltage surge across the neutral and ground connections using a third voltage limiting circuit coupled between the second node and the third node;
limiting current from the power surge across the neutral and ground connections through the third voltage limiting circuit using a series inductance coupled between the neutral connection and the second node;
limiting voltage across the neutral connection and the ground connection in response to the power voltage surge across the neutral and ground connections using a fourth voltage limiting circuit coupled between the neutral connection and the ground connection of the power source.

9. The method of claim 8, further comprising:
limiting voltage across the first node and the third node in response to a power voltage surge across the line and ground connections using a fifth voltage limiting circuit coupled between the first node and the third node.

10. The method of claim 7, wherein the first voltage limiting circuit has a lower trigger voltage than the second voltage limiting circuit, and wherein the method further includes turning the first voltage limiting circuit on prior to turning the second voltage limiting circuit on.

11. The method of claim 8, wherein the third voltage limiting circuit has a lower trigger voltage than the fourth voltage limiting circuit, and wherein the method further includes turning the third voltage limiting circuit on prior to turning the fourth voltage limiting circuit on.

12. The method of claim 7, further comprising using a metal oxide varistor in the third voltage limiting circuit.

13. The method of claim 12, further comprising using a metal oxide varistor in the fifth voltage limiting circuit.

* * * * *